United States Patent [19]

Martinez

[11] Patent Number: 4,823,382
[45] Date of Patent: Apr. 18, 1989

[54] ECHO CANCELLER WITH DYNAMICALLY POSITIONED ADAPTIVE FILTER TAPS
[75] Inventor: Aldo A. Martinez, Miami, Fla.
[73] Assignee: Racal Data Communications Inc., Sunrise, Fla.
[21] Appl. No.: 913,929
[22] Filed: Oct. 1, 1986
[51] Int. Cl.[4] .............................................. H04B 3/23
[52] U.S. Cl. ..................................... 379/411; 370/32.1
[58] Field of Search ............... 379/406, 407, 410, 411, 379/345; 370/32, 32.1

[56] References Cited

U.S. PATENT DOCUMENTS

| | | | |
|---|---|---|---|
| 3,465,106 | 9/1969 | Nagata et al. | 379/410 X |
| 3,535,473 | 10/1970 | Flanagan et al. | 379/410 |
| 3,578,544 | 3/1986 | Colin de Verdiere et al. | |
| 3,721,777 | 3/1973 | Thomas | 379/410 |
| 3,723,911 | 3/1973 | Forney, Jr. | 333/18 |
| 3,732,410 | 5/1973 | Mackechnie | 379/406 |
| 3,735,055 | 5/1973 | Thomas | 379/410 |
| 4,024,357 | 5/1977 | Sourgens et al. | 379/411 |
| 4,087,654 | 5/1978 | Mueller | 379/411 |
| 4,464,545 | 8/1984 | Werner | 370/321 |
| 4,582,963 | 4/1986 | Danstrom | 379/411 |
| 4,593,161 | 6/1986 | Desblache et al. | |
| 4,602,133 | 7/1986 | O'Neill | 370/32.1 |
| 4,677,668 | 6/1987 | Ardalan et al. | 379/411 |

FOREIGN PATENT DOCUMENTS 0107928  6/1985  Japan .................................. 370/32.1

OTHER PUBLICATIONS

Translation Japanese Patent Publication 57-42242, United States Patent and Trademark Office, 9-87.
*Digital Signal Processing*, 1975 Prentice-Hall, pp. 239-250.
*Digital Processing of Signals*, Gold and Rader, Lincon Laboratory Publication, 217-232.
*Digital Filter Design Handbook*, Marcel Dekker, Inc., 1983, pp. 135-151.
IBM Technical Disclosure Bulletin, vol. 21, No. 5, Oct. 1978, (New York, U.S.), "Centering Transversal Equalizer Tap Coefficients".
IEEE Global Telecommunications Conference, Houston, Tex., 1-4 Dec. 1986, "A DSP-Based Echo-Canceller with Two Adaptive Filters".
*Signal Analysis*, by Athanasios Papoulis, 1977.
Shin-ichi Kawamura and Mitsutoshi Hatori, "A Tap Selection Algorithm for Adaptive Filters", Proceediongs of ICASSP, pp. 2979-2982, 1986.
Makoto Itami, Takashi Mochizuki and Mitsutoshi Hatori, "Hardware Implementation of FM Mutlipath Distortion Canceller", Proc. of ICASSP, pp. 1301-1304, 1986.
Bede Lie, "Effect of Finite Word Length on the Accuracy of Digital Filters-A Review", IEE Trans. Circuit Theory, pp. 361-369, Nov. 1971.
Oscar Agazzi, David G. Messerschmitt and David A. Hodges, "Nonlinear Echo Cancellation of Data Signals", IEE Transactions on Communications, pp. 2421-2433, Nov. 1982.
Stephen B. Weinsten, "Echo Cancellation in the Telephone Network" IEE Communications Society Magazine, pp. 9-15, Jan. 1977.
M. M. Sondhi, "An Adaptive Echo Canceller", The Bell System Technical Journal, pp. 497-511, Mar. 1967.

*Primary Examiner*—Jin F. Ng
*Assistant Examiner*—Randall S. Vaas
*Attorney, Agent, or Firm*—Jerry A. Miller

[57] ABSTRACT

An echo canceller according to the present invention includes means for storing an impulse response in a memory, the impulse response being indicative of the characteristics of a transmission line. It also includes a detector for detecting ranges of samples within the impulse response having relatively large distribution of echo energy, these ranges of samples of relatively large distribution of echo energy being indicative of echoes on the transmission line. An echo canceller includes a digital filter having a plurality of weighted taps, each of the weighted taps having an associated tap weight value. A tap allocation circuit establishes the tap weight values in response to said detecting means so that only taps within the regions of relatively large distributions of echo energy are turned on. The ranges of echo energy are detected coarsely by detecting ranges of samples having relatively high estimated average echo power. The echo is more finely located by computing the terms analogous to the mechanical computation of the center of gravity type calculation referred to as a 'center of echo' and radius of gyration type calculation referred to as 'radius of echo' of the echo energy within the coarsely located ranges of samples.

19 Claims, 6 Drawing Sheets

ECHO CANCELLER WITH DYNAMICALLY POSITIONED ADAPTIVE FILTER TAPS

CROSS REFERENCE TO RELATED APPLICATIONS

This invention is related to a copending patent application filed simultaneously herewith to Jerry A. Miller entitled "Echo Canceller With sparse Dynamically Positioned Taps, Docket Number 5092, assigned to the Assignee of the present invention. This application is incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

This invention relates generally to the field of echo cancellers and more particularly to adaptive echo cancellers having dynamically positioned adaptive filter taps.

2. Background of the Invention

Impedance mismatches and other circuit discontinuities in telephone lines often result in the presence of echoes on such lines. Such mismatches generally occur at 2 wire to 4 wire and 4 wire to 2 wire transitions. This is, of course, undesirable in full duplex or even half duplex ping pong type data communications circuits in that such echoes are interpreted by a receiver as noise which can corrupt incoming received signals. Such echo signals may take on many forms with the most common being that of a near end echo (resulting from discontinuities and mismatches at a local telephone office) plus far end echoes (resulting from such discontinuities or mismatches at remote telephone offices). An example of such echoes is shown in FIG. 1 where the near end echo is represented by echo 12 and the far end echo is represented by echo 14.

Figure 1:
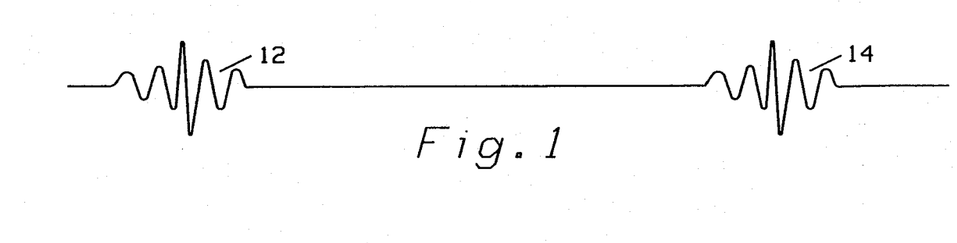
FIG. 1 shows an echo response having near end and far end components of approximately equal energy.
Figure 2:
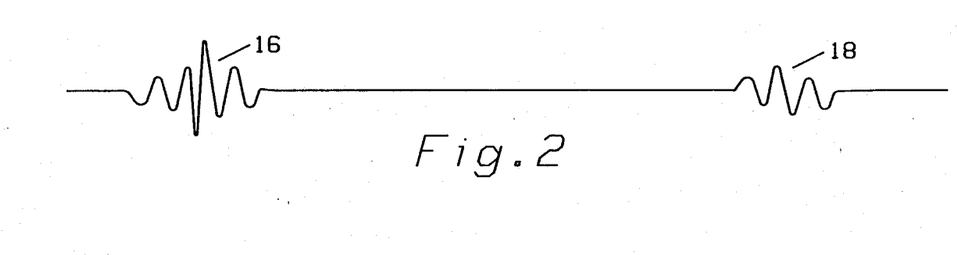
FIG. 2 shows an echo response having a small far end component and a significantly larger near end component.

In the example of FIG. 1, near end echo 12 is shown to be approximately the same magnitude as echo 14. Another possibility is shown in FIG. 2 with echo 16 representing the near end echo and a somewhat smaller echo 18 representing the far end echo.

One of the more common techniques for dealing with such echoes is described in U.S. Pat. No. 4,464,545 to Werner. This echo canceller structure utilizes a near end canceller to cancel the near end echo and a far end canceller to cancel to the far echo. The two "subcancellers" are separated by a bulk delay unit to account for the silent period between the near end and far end echoes. This structure requires knowledge of when in time an echo is likely to occur and how long the echo is likely to last.

U.S. Pat. No. 4,582,963 improves upon this echo canceller arrangement by allowing the bulk delay unit to be variable. In this patent, the variable bulk delay allows for varying distances between the local and remote offices so that the near end canceller and far end canceller can be optimally situated in time to assure the cancellation of both the near end and far end echoes.

Unfortunately, neither of the arrangements shown in the above-referenced patents can account for an echo signal such as that shown in FIG. 3A. In this echo signal, a near end echo 20 is followed by an intermediate echo 22 which is then followed by a far end echo 24. According to published studies by Bell Telephone Laboratories, such intermediate echoes occur in approximately 30% of all data communications situations. The echo cancellers of Werner and U.S. Pat. No. 4,582,963 to Danstrom are unable to cope with such intermediate echoes thus, substantial corruption of data may occur as a result.

Figure 3:
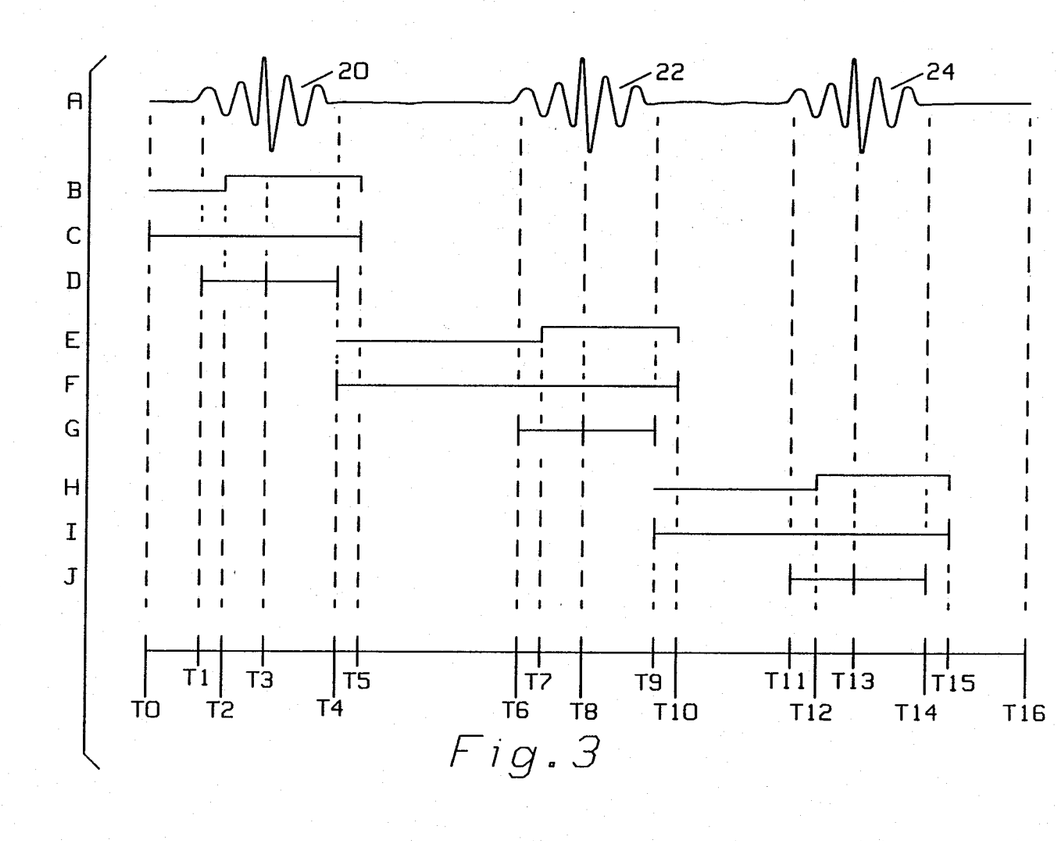
FIG. 3 shows an echo response or impulse response of a transmission line having near end, far end and intermediate echo energy as well as a group of figures (B–J) which outline the tap selection process of the present invention.

In a paper published at the I.C.A.S.S.P. 86 in Tokyo entitled "A Tap Selection Algorithm For Adaptive Filters", Kawamura et al., discuss a tap adaption algorithm entitled "Scrub Taps Waiting In a Queue" or "STWQ" which may allow a digital adaptive filter to ultimately adapt to such an intermediate echo 22 as shown in FIG. 3. Unfortunately, this echo canceller has another drawback encountered by the two previously mentioned types of echo cancellers: namely, that it is undesirable for an echo canceller to operate at times when there is no echo. Running an echo canceller under such circumstances merely creates computational noise as a result of finite word length accuracy in the digital transversal filter. This may actually hinder the reception of data in a marginal line. It is therefore desirable to provide a digital echo canceller structure which overcomes these and other problems associated with conventional echo canceller structures.

SUMMARY OF THE INVENTION

It is an object of the present invention to provide an improved echo canceller circuit which reduces computational noise when there is no echo to cancel.

It is another object of the present invention to provide an improved echo canceller structure which adapts readily to intermediate echoes.

It is a further object of the present invention to provide an improved echo canceller structure which readily adapts to many arbitrary echo responses.

These and other objects of the invention will become apparent to those skilled in the art upon consideration of the following description of the invention.

In one embodiment of the present invention, a method of allocating filter taps in an echo canceller for a transmission line includes the steps of storing a plurality of samples of a signal representative of the transmission line's impulse response in a memory; examining the plurality of stored samples to find ranges of samples of the impulse response having echo energy; and allocating a variable number of filter taps of the echo canceller only to taps within the ranges of samples having echo energy.

In another embodiment of the present invention, an echo canceller includes a memory for storing an impulse response, the impulse response being indicative of the characteristics of a transmission line. A detecting circuit detects ranges of samples within the impulse response having echo energy. An echo canceller includes a digital filter having a plurality of weighted taps, each of the weighted taps having an associated tap weight value. A tap allocator activates and deactivating variable numbers of taps in response to the detecting circuit so that only taps within the ranges of samples are activated within the echo canceller.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

The present invention ameliorates the above problems by allocating echo canceller taps only during time periods when there is actually an echo present. That is, the overall echo canceller structure looks like a conventional echo canceller having a very large tapped delay element. But, only certain groups of taps are actually turned on at any given time. The present invention examines the impulse response of the line (which corresponds to tap weights for a transversal filter) an allocates taps according to where an echo is actually occurring on the line.

To illustrate the principle of the present invention, the echo of FIG. 3A is used as an example. It is presumed, for purposes of illustration, that this echo signal is already stored in memory and this may be effected by any of a number of known techniques. For example, an approximate impulse signal can be applied to the transmission line of interest and the echo signal stored as it is received. This stored impulse response may then be used as the tap weights (either with or without windowing using an appropriate windowing function as desired) for a transversal filter structure according the present invention. In the preferred embodiment, a pulse is used to sound the line and the echo (impulse response) is stored in a block of memory. This stored impulse response can then be analyzed to determine where significant blocks of echo energy are located. Since the modem is being trained at this time, plenty of processor power is available for locating the echo energy as follows.

According to the present invention, an estimate of the average power in the waveform is computed sample by sample and when a predetermined average power threshold is exceeded as shown in FIG. 3B at time T2 a start flag is set. The power calculation is continued until time T5 when the average power drops below a second threshold indicating that the end of the echo signal has been passed (due to the inertia of the average power estimate). It should be noted that because an estimate of the average energy is being measured, time T2 always occurs after the start of the echo and time T5 always occurs after the end of the echo. At this point it known that the entire echo lies somewhere between times T0 and T5 as shown in FIG. 3C. Thus, the echo signal has been coarsely located.

In order to refine the approximate location of the echo, the present invention utilizes a computation referred to herein as 'center of echo' which is analogous to the mechanical computation of the center of gravity of waveform 20 in order to locate the center of the echo. The center of echo is computed using the following equation:

$$G(n) = \frac{\sum_{k=1}^{K} k \, |h(k)|^2}{1 + \sum_{k=1}^{K} |h(k)|^2} \qquad \text{EQUATION 1}$$

Where:
n = the echo index
G(n) = center of echo associated with the $n^{th}$ echo
K = number of samples over which computation is performed
k = the sample index
h = impulse response signal This computation is done over the entire range of samples shown in FIG. 3C (T0 to T5).

It should be carefully noted that although the waveform shown in FIG. 3A appears to be a continuous waveform, according to the preferred embodiment the present invention utilizes periodic digitized samples of the waveform of FIG. 3A so that the above calculation may be readily effected.

The computation of center of echo G(n) locates the center of waveform 20 about which the energy is approximately equally distributed. This center in this example is approximately at time T3. Next it is desirable to determine the extent of the spread of the energy of echo 20. This accomplished by a calculation referred to herein as 'radius of echo' which is analogous to the mechanical computation of the radius of gyration of the energy of the waveform 20. This calculation uses the following equation:

$$R(n) = \frac{\sum_{k=1}^{K} [k - G(n)]^2 \, |h(k)|^2}{1 + \sum_{k=1}^{K} |h(k)|^2} \qquad \text{EQUATION 2}$$

When the radius of echo R(n) is computed, it can be utilized to determine the range about the center of echo which contains the echo signal. It has generally been determined that most of the echo energy lies between 2.5 and 3.5 times the radius of echo about the center of echo. In the preferred embodiment, the radius of echo is multiplied by approximately 3 to determined the extent of the echo, but this is not to be limiting. The actual factor is a parameter which may be selected to achieve a desired level of echo cancellation with larger factors resulting in a larger time range of echo energy to be canceled. Multiplication of the radius of echo by larger factors results in a higher level of echo cancellation at the expense of allocation of a greater number of taps. In the present example, computation of the radius of echo R(n) and center of echo G(n) results in a center of gravity at approximately T3 with three times the radius of echo lying at time T1 and T4 as shown in FIG. 3D. Therefore, time T1 marks the start of echo 20 and time T4 marks the end of echo 20 for purposes of allocating taps in the present echo canceller. Therefore, any samples in the echo canceller occurring between time T1 and T4 of the impulse response should be turned on and allocated with appropriate tap weights according to the characteristics of echo 20. A tap is considered to be turned on if it is actually used as a multiplying factor in the transversal filtering process (equivalently, the tap weight may be set exactly to zero).

After the first echo response 20 has been located, the present invention then begins searching for a second echo response as shown in FIG. 3E. The process is essentially the same as that outlined previously and may be effected using the same algorithm as previously. The search begins at time T4 (the end of the first echo) and proceeds until time T7 where the average energy exceeds the first predetermined threshold. At time T10 the average energy drops below the second predetermined threshold so that the second echo response 22 is now coarsely located between times T4 and T10 as depicted in FIG. 3F. The same operation as was carried out in conjunction with the first echo now takes place for the second echo 22. In this case, the center of echo G(n) and radius of echo R(n) computations are carried out from the offset time at T4 all the way through time T10 where the average energy of the echo was determined to have dropped below the second predetermined threshold. The results of these calculations are shown in FIG. 3G wherein the center of echo of waveform 22 is at time T8 and the radius of echo computation results in a distribution of echo energy from approximately T6 to approximately T9. As before, this is obtained by multiplying the radius of echo by a factor of three.

The far end echo 24 is similarly found by measuring the average power as shown in FIG. 3H until the power exceeds the first predetermined threshold at time T12. When the average power drops below the second predetermined threshold at time T15, the echo has been coarsely located as shown in FIG. 3I. In this case the center of echo and radius of echo calculations are carried out from T9 to T15 as shown in FIG. 3I. With echo 24 the resulting center of echo is approximately at T13 with three times the radius of echo resulting in end points for echo 24 at T11 and T14. Although not shown in FIG. 3, at time T14, the search for a fourth echo may be instituted by measuring the average energy of the waveform of FIG. 3A until time T16 which corresponds to the longest conceivable echo signal in this example. Even more echoes can be canceled given sufficient computation power.

A subroutine written in Fortran IV and implemented on a VAX minicomputer is shown in Table 1 as an example of the implementation of a routine for finding an individual echo. Of course it will be appreciated by those skilled in the art that the present invention is more desirably implemented on a significantly smaller scale machine such as a microcomputer forming a part of a data modem. It is therefore contemplated that the present invention will be more desirably implemented in a lower level language such as assembly language for a powerful microcomputer such as the Texas Instruments TMS 320C-25 and similar advanced microcomputers so that rapid allocation of taps can be effected. This processor family is particularly well suited to real time digital signal processing. Alternatively, the present invention may be implemented using several less powerful microcomputers. Since the present invention is implemented largely during a training period during which time the modem adapts itself to a particular set of line conditions, the computing power utilized in computing the center of echo and radius of echo as previously described as well as the average power computations may be desirably calculated utilizing computing power which may be allocated (after the training period) to implementing the echo canceller itself and or other desired features of the modem of the preferred embodiment.

The following symbols are used in the ECHOFIND subroutine:

NF Power Detected Flag
NFP Power Present Flag
TH1 First (Higher) Power Detector Threshold
TH2 Second (Lower) Power Detector Threshold
E Accumulated Energy

TABLE 1

SUBROUTINE ECHOFIND(NOFST, NEND,CGRV,RGR,NTP1,NTP2)
COPYRIGHT © RACAL-MILGO, 1986,
UNPUBLISHED WORK

```
! This subroutine searches a specified array for energy.
! Once the energy containing segment of the array is located,
! the center of echo and radius of echo of the energy
! distribution are calculated.
! The samples in the array are complex valued. All
! calculations are carried out in terms of the square
! of the magnitude of the samples. In the event that
! the whole array is searched and no energy is detected,
! the subroutine returns with CGRV and RGR holding zero
! value and NTP2=NEND.
! Inputs:
! NOFST:     Pointer to the starting address of the array to
!            be searched for energy.
! NEND:      End of array.
! HR(), HI(): Real, imaginary parts of the elements
!            of the array.
! ALPHA:     Time constant for the integrator in the average
!            power detector.
! TH1,TH2:   Energy detector off-on, on-off thresholds resp.
! Outputs:
! CGRV:      Center of echo of the energy distribution.
! RGR:       Radius of echo.
! NTP1, NTP2: Start, end addresses of array segment for
!            which the average power detector was on.
! Initialization:
REAL HMAG (1024)
COMMON HR (1024), ALPHA, TH1, TH2
E=0
PAVG=0
CPRM=0
N=1
NF=0
NFP=0
TH=TH1
NTP1=0
NTP2=0
20  K=N+NOFST
    IF(K GE NEND) GOTO 70
    HMAG(N)=HR(K)*HR(K)+HI(K)*HI(K)
    PAVG=ALPHA*PAVG+(1.0−ALPHA)*HMAG(N)
    IF(PAVG LT TH) GOTO 30      !ENERGY FLAG ON
    F=1                         !SWITCH THRESHOLD
    TH=TH2
    IF(NFP GT 0) GOTO 40
    NFP=1
    NTP1=K                      !First sample w/energy.
40  N=N+1
    GOTO 20
30  NF=0
    IF(NFP NE 1) GOTO 40
50  NTP2=K
!   Calculate GCRV, RGR
!
    E=0
```

TABLE 1-continued

SUBROUTINE ECHOFIND(NOFST,
NEND,CGRV,RGR,NTP1,NTP2)
COPYRIGHT © RACAL-MILGO, 1986,
UNPUBLISHED WORK

```
      CGRV=0
      DO 55 I=1, NTP2-NOFST
      E=E+HMAG(I)
55    CGRV=CGRV+FLOAT(I)*HMAG(I)
      CGRV=CGRV/E
      RGR=0
      DO 60 I=1, NTP2-NOFST
      R=(FLOAT(I)-CGRV)**2
60    RGR=RGR+R*HMAG(I)
      RGR=RGR/E
      RETURN
!     Get here if end of array was reached
!
70    IF (NTP1 GT 0) GOTO 50    !Compute CG, R if energy.
!     Get here if no energy was found
!
      CGRV=0
      RGR=0
      NTP2=NEND
      RETURN
      END
```

Figure 4:
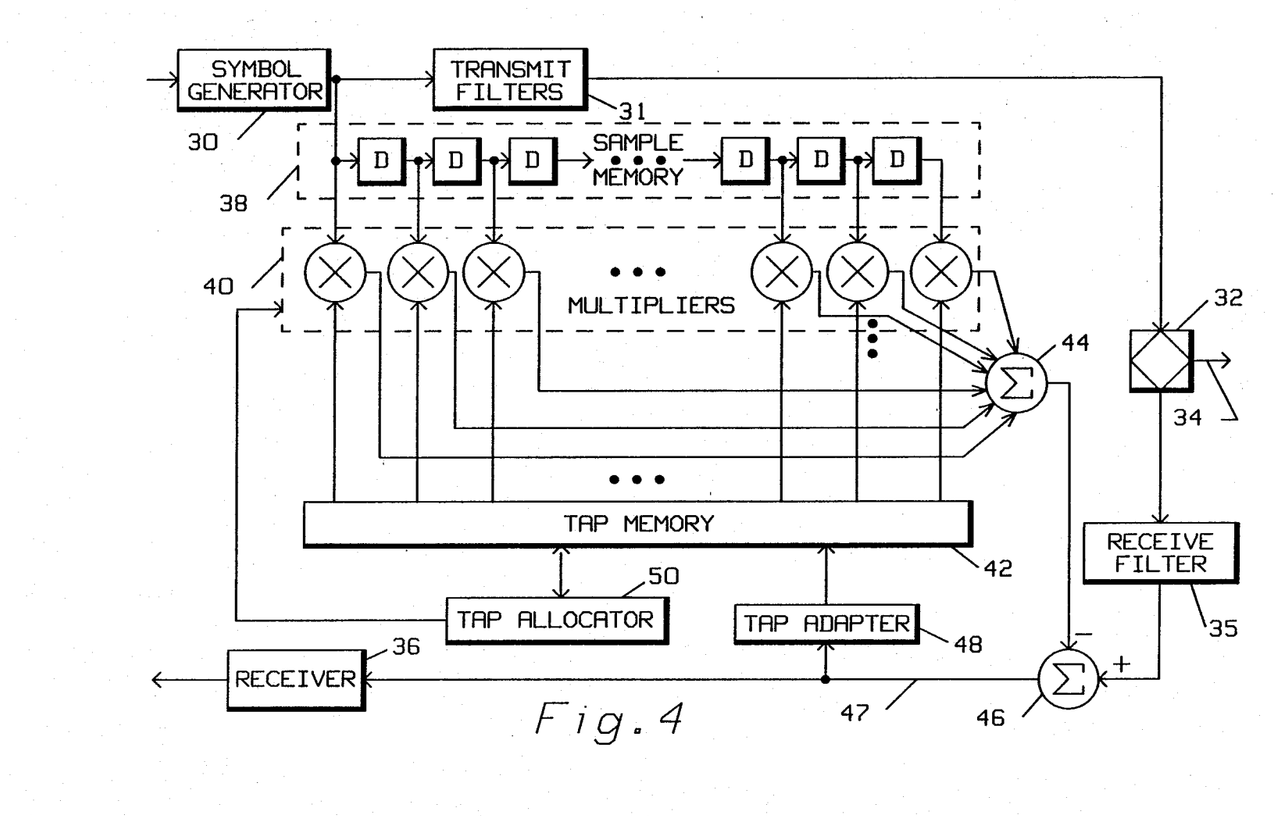
FIG. 4 shows the structure of the echo canceller of the present invention in block diagram form.

Turning now to FIG. 4, an overall block diagram of the echo canceller of the present invention is shown. Those skilled in the art will recognize that many variations of the present invention may be possible. FIG. 4 shows a symbol generator 30 which is coupled through transmit filters 31 to a hybrid 32 which combines transmitted signals with received signals on transmission line 34. The receive path supplies the received signal from hybrid 32 to receive filter 35 which in turn passes the signal on to receiver 36 (through a portion of the echo canceller). The output of transmitter 30 is also applied to the echo canceller of the present invention which includes a sample memory 38. This sample memory 38 may be conceptualized as a group of shift registers having predetermined delay coupled in series or as a tapped delay line.

Sample memory 38 should have an adequate number of storage locations to store enough samples of input signal to span an entire echo response. Sample memory may be implemented in any of a number of possible ways including use of a shift register, a tapped delay line or a portion of a computer's random access memory (RAM). By way of example, in a 9,600 baud modem operating with a sampling rate of 7200 hertz over telephone lines with a conventional 300 to 3400 hertz bandwidth approximately 8 to 10 thousand words of random access memory should be reserved for sample memory 38 in order to allow for the maximum echo duration. The outputs of sample memory 38 are provided to a group of multipliers 40 including one multiplier for each time delay associated with sample memory 38. Each of the multipliers of 40 multiplies a (preferably digitized) sample of the transmitted signal by a tap weight stored in a tap memory 42. Tap memory 42 should initially be of similar length as memory 38 but depending upon the allocation of taps, some of or in fact all of tap memory 42 may be freed up for other uses in the modem depending on the extent of the echo problem. Each of the multiplied outputs of the multipliers 40 are summed together in a summation block 44 prior to being subtracted from the incoming received signal at 46.

In the preferred embodiment the tap weights of the active taps stored in tap memory 42 are preferably adapted continually to provide near optimum echo cancellation by a tap adapter 48. Tap adapter 48 may operate in accordance with any known tap adaption technique such as the well known steepest descent technique for tap adaption. Other tap adaption algorithms may occur to those skilled in the art.

According to the present invention, many of the taps will be turned off by tap allocator 50 according to the technique previously discussed. In effect, tap allocator 50 operates by bypassing any multiplication operations which would be normally be performed on a particular tap. In effect, this means that multiplications which would ordinarily be carried out if the echo canceller of FIG. 4 were operating in a conventional manner are not actually carried out. In this manner, noise generated by computational inaccuracies and finite number accuracies are not passed on to the receiver. Also, savings in computational effort are obtained since the steps of multiplication and adding for turned off taps are conserved. Conceptually, however, tap allocator 50 may also be thought of as setting the tap value a particular location to zero. The net result of the present invention is that the echo canceller will operate as though it includes several dynamically allocated bulk delay elements separating distinct dynamically allocated echo canceller subsystems made up of contiguous groups of taps allocated in ranges of samples corresponding to areas of significant detected echo energy.

Figure 5:
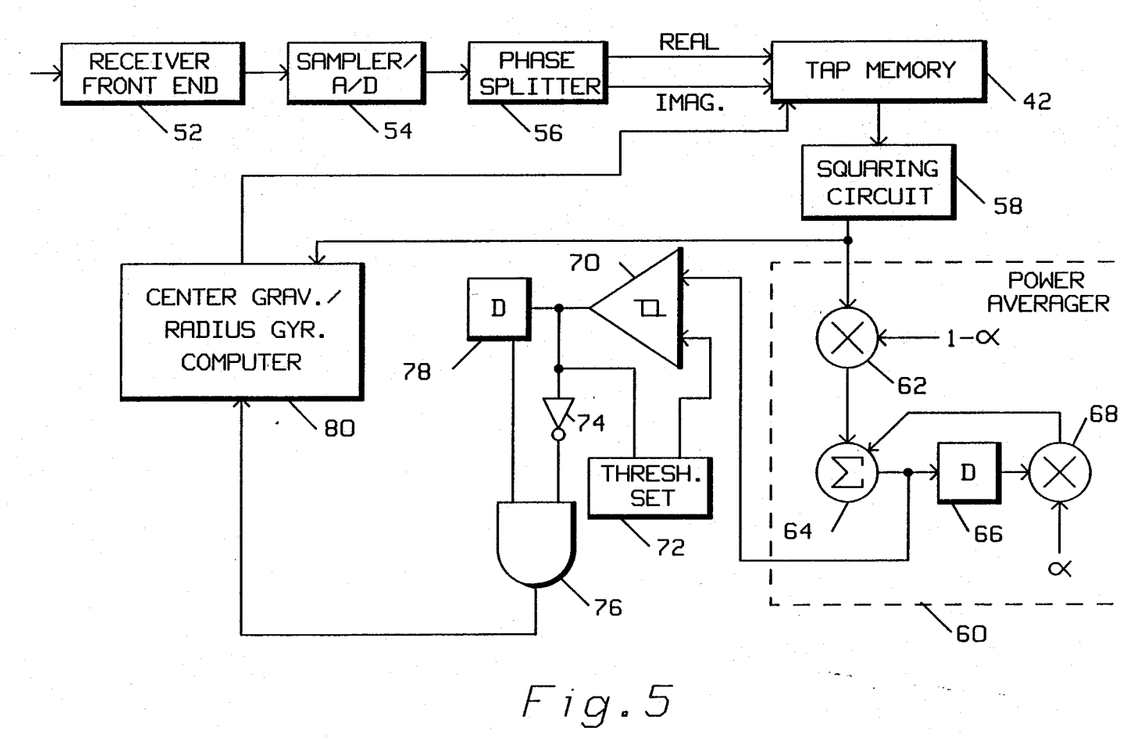
FIG. 5 shows a functional block diagram of the tap allocator of the present invention.

Turning now to FIG. 5, a more detailed diagram of the tap applicator of the present invention is shown. In FIG. 5 an echo signal is received as an input to the receiver front end 52 which includes the modem's line interface circuits, equalizers, amplifiers, filters, etc. The received signal is then sampled and converted to digital form at a sampling analog to digital converter 54. The output of sampling analog to digital converter 54 is applied to a phase splitter 56 which separates the incoming echo signal into real and imaginary parts and stores the echo signal in complex double precision form in memory 42. The received echo signal as will be appreciated by those skilled in the art, is preferably obtained by sounding out the transmission channel by application of an impulse or by other techniques known in the art.

Once the entire impulse response is stored in memory 42, the echo samples are sequentially removed and applied to a squaring circuit 58 which computes the magnitude squared of the complex echo samples. The output of the squaring circuit 58 is applied to the power averaging circuit 60 which estimates the average power by multiplying the squared signal from 58 by one minus alpha at 62 and applies that signal to an adder 64. The output of adder 64 is passed through a delay 66 prior to multiplication by alpha at 68. The output of 68 is applied back to adder 64. The output of adder 64 represents an estimate of the average power of the echo signal which is then applied to one input of a comparator 70.

Averaging circuit 60 is actually a single pole IIR filter in the preferred embodiment which provides an adequate estimate of the average power for purposes of the present invention. Alpha ($\alpha$) is a design parameter which influences the reaction time of the energy detector and may be adjusted experimentally to obtain the desired performance. The comparator 70 compares the average power to a first threshold set from threshold set 72. This first threshold has a relatively high value. When the estimated echo energy or power exceeds this first threshold at 70, the output of comparator 70 toggles and is inverted at invert 74 and then applied to one end of an AND gate 76. The output of comparator 70 is also passed through a delay 78 and then applied to a second output of AND gate 76. When the estimated average power of the echo signal exceeds the first threshold, the output of AND gate 76 toggles indicating to a center of echo and radius of echo computer (or center of echo and radius of echo computer) 80 that a signal of significant energy has been located. When the output of comparator 70 toggles the threshold set circuit 72 modifies the threshold to a lower value thereby causing hysteresis to be implemented so that momentary dips in average power will be ignored until such average power clearly dips below the second predetermined threshold. When this second predetermined threshold is passed the start signal at the output of AND gate 76 is inverted indicating to the center of echo and radius of echo computer 80 that the end of a region of significant echo energy has been found.

The output of squaring circuit 58 is also provided to center of echo and radius of echo computer 80 in order to simplify the calculation of these quantities. Once the computer 80 calculates the center of echo in radius of echo and determines which taps are appropriately turned off and which are appropriately retained and this information is fed back to 42 for later use in canceling the echo signals. This may be accomplished prior to the phase splitter 56 once the tap values and tap locations are determined as is known in the art.

Figure 6:
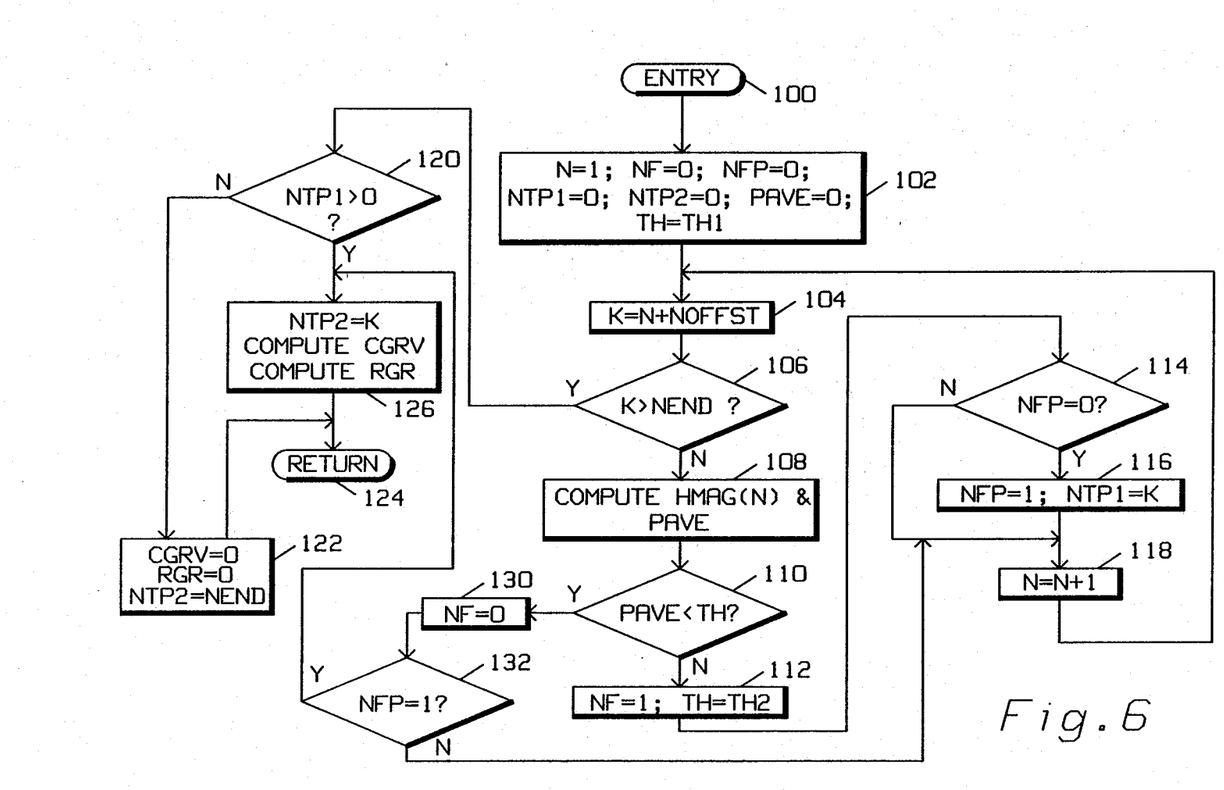
FIG. 6 shows a flow chart of the routine for finding echoes in the present invention.

As previously discussed, the ECHOFIND routine of Table 1 may be utilized to implement a portion of the present invention which finds the location of the echo signal. This routine is also described by the flow chart shown in FIG. 6 which starts at entry point 100. The variables listed in the flow chart of FIG. 6 are identical in definition to those of Table 1 and are defined in the comment section thereof. After entry point 100 an initialization is carried out at step 102 in preparation of finding the echo signal. After initialization at 102 control is passed to step 104 which corresponds to line 20 of subroutine ECHOFIND in which K is set to equal N+NOFFST. After step 104 control is passed to decision block 106 which tests the value of K to determine if it is greater than NEND. If K is not greater NEND, control is passed to step 108 in which the magnitude square and average power are computed.

The average power computation utilizes an integration time constant alpha which may be refined in value experimentally. In the preferred embodiment, it is approximately equal to 1.0, but this is not to be limiting. After step 108, control is passed to a decision block 110 which tests to determine if the average power is less than the threshold. If not, control passes to step 112 which sets NF equal to 1 and TH equal to TH2. Control then passes from block 112 to decision block 114 which checks to determine whether or not NFP is equal to 0. If it is, control passes to block 116 which sets NFP=1 and NTP1=K. Control then passes from 116 to step 118 which corresponds to line 40 of the ECHOFIND subroutine. At step 118 N is incremented by 1 and control passes back up to step 104.

If K is greater than NEND (indicating that the end of memory has been reached) at decision block 106 control passes to decision block 120 which corresponds to line 70 of subroutine ECHOFIND. Decision block 120 determines whether or not NTP1 is greater than zero (that is whether or not energy was present in the last segment scanned). If it is not greater than zero (no energy), control passes to block 122 which sets the center of echo and radius of echo equal to zero and sets NTP2 equal to NEND. The subroutine then returns at return block 124. If NTP1 is greater than zero at step 120, control passes to step 126 which corresponds to line 50 of subroutine echo find which sets NTP2 equal to K, computes the center of echo, and computes the radius of echo before passing control to return block 124.

If the average power is less than the threshold at step 110 then control passes to block 130 which corresponds to line 30 of subroutine echo find. In block 130 NF is set equal to zero and control is passed to decision block 132 which tests the value of NFP. If NFP is equal to one, control is passed to block 126. If NFP is not equal to one, control is passed to block 118.

Figure 7:
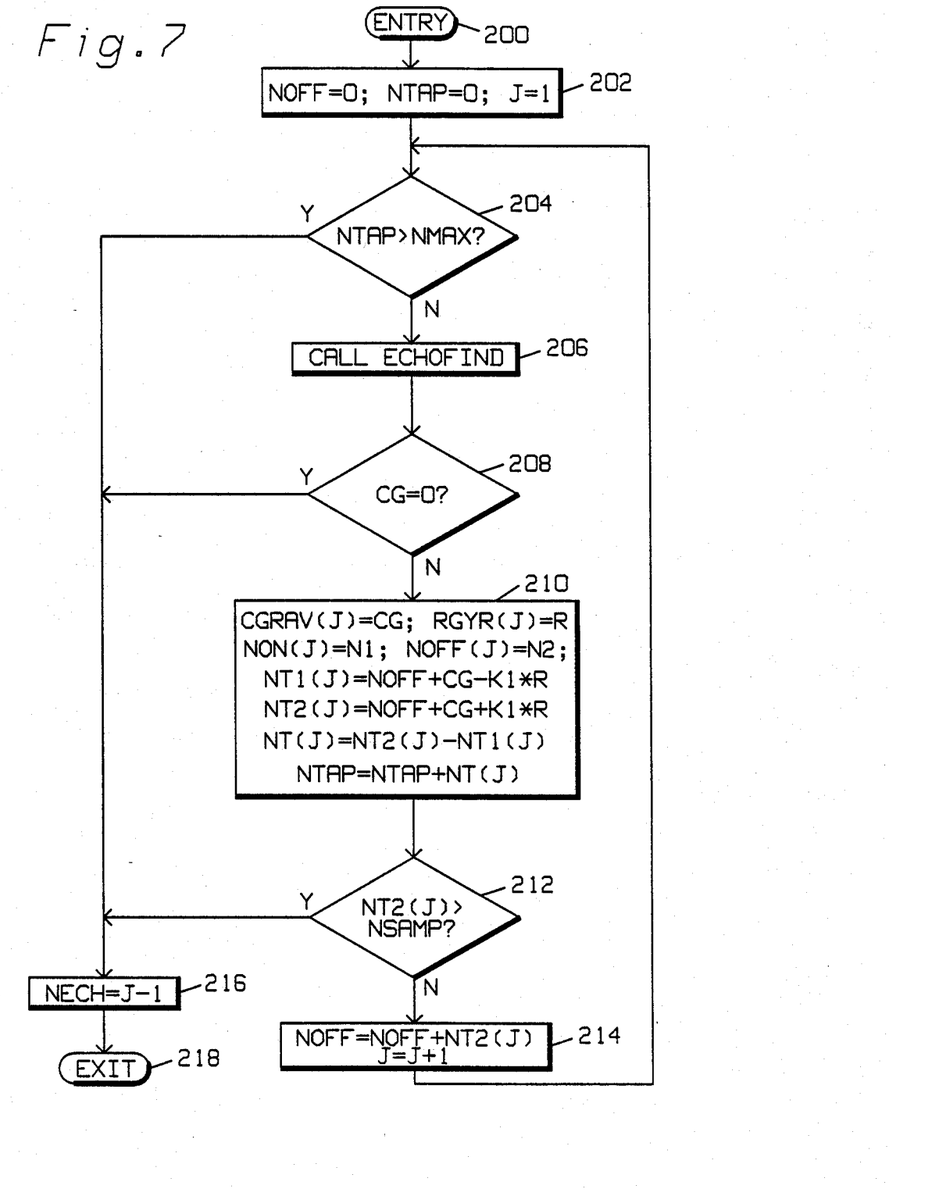
FIG. 7 shows a flow chart of a routine used to find multiple echoes in accordance with the present invention.

This routine can be used to find a single contiguous range of samples containing substantial echo energy within a group of samples. It can be repeatedly called until all samples have been evaluated. Turning now to FIG. 7, a flow chart is shown which uses the routine of FIG. 6 to find a plurality of echo signals having substantial energy. The routine of FIG. 7 begins at entry point 200 and then control is passed to step 202 which initializes NOFF to equal zero (start of array), NTAP equal to zero and the echo counter J to equal 1. Control then passes from step 202 to decision block 204 which compares NTAP and NMAX (to determine if all available taps have been used up). If NTAP is not greater than NMAX, control is passed to step 206 which calls the subroutine ECHOFIND as described in table 1 or in flow chart of FIG. 6. After ECHOFIND has returned, control passes to decision 208 which checks to see if the center of echo is equal to zero (no energy). If not, the following calculations are carried out at step 210:

CGRAV(J)=CG
RGYR(J)=R
NON(J)=N1
NOFF(J)=N2
NT1(J)=NOFF+(GG−K1.R) (Address of first tap allocated to $J^{th}$ echo)
NT2(J)=NOFF+(CG+K1.R) (Address of last tap allocated to $J^{th}$ echo)
NT(J)=NT2(J)−NT1(J) (Total number of taps allocated to $J^{the}$ echo)
NTAP=NTAP+NT(J) (running sum of used taps).

K1 is the scale factor for R and is preferably approximately 3.

Control then passes from block 210 to decision block 212 which compares NT2(J) with NSAMP. If is not greater than NSAMP then control passes to block 214 where J is incremented by 1 and NOFF is set equal to NOFF plus NT2(J). Control then passes from block 214 back to block 204. If at step 212, NTP(J) is greater than NSAMP (note that total memory=NSAMP and NMAX may be lower than NSAMP due to quiet periods of insignificant echo) then control is passed to block 216 where NECH is set equal to J−1. After block 216 the routine is exited at 218. Block 216 may also be entered via decision blocks 204 or 206 if NTAP is greater than NMAX or if CG equals zero respectively.

The present invention therefore provides a mechanism for allocating contiguous groups of echo canceller taps only in regions where they are required for actual cancellation of echo energy. As such, unnecessary computational noise is avoided, processor power is conserved and intermediate or unusual echoes are readily handled with the same hardware that is utilized to cancel more conventional echo signals. Of course, many variations are possible without departing from the present invention. For example, comparison of the estimate of average energy taken over a range of samples can be used as the sole selection criterion for active taps with the advantage of less computation to find the taps but generally requiring more active taps to accommodate. Other methods of finding ranges of samples containing echo energy will occur to those skilled in the art.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A method of allocating filter taps in an echo canceller for a transmission line comprising the steps of:
    storing a plurality of samples of a signal representative of said transmission line's impulse response in a memory;
    examining said plurality of stored samples to find variable sized ranges of samples of said impulse response having at least a predetermined amount of echo energy, said examining step including computing a center of echo of each of said ranges of said samples in order to find the approximate center of each of said ranges of samples of impulse response containing echo energy; and
    allocating a variable total number of filter taps of said echo canceller by turning on only those taps corresponding to said ranges of samples having at least said predetermined amount of echo energy.

2. The method of claim 1, wherein said examining step further includes the step of computing a radius of echo about each said center of echo for each of said ranges of samples; and wherein said allocating step includes the step of assigning nonzero values of tap weighting values to all tap weights within a predetermined multiple of said radii of echo about each said center of echo.

3. The method of claim 1, wherein said allocation step includes the step of assigning a predetermined maximum number of nonzero tap weight values and wherein said nonzero tap weight values are assigned to ranges of samples containing a maximum amount of echo energy.

4. The method of claim 1, wherein said stored plurality of samples is obtained by applying a pulse of energy to said transmission line and measuring a signal on said transmission line which is produced as a result of said application of said pulse of energy.

5. The method of claim 1, further including the step of modifying said allocated tap values with a window function.

6. The method of claim 1, wherein said examining step includes the step of comparing an estimate of the average power of ranges of said stored samples to a threshold.

7. The method of claim 1, wherein said examining step includes the steps of:
    comparing an estimate of the average power of ranges of said stored samples to a threshold as a coarse estimate of the location of said ranges of samples containing echo energy;
    computing the center of echo of samples within said coarse estimate and computing a radius of echo associated with and about each of the centers of echo; and
    determining which of the samples in said coarse estimate fall within a predetermined multiple of its associated radius of echo as a fine estimate of the location of said echo to be used as said range of samples.

8. The method of claim 1, wherein said examining step includes the step of computing a measure of distribution of echo energy about each said approximate center in order to locate a beginning and an end for each of said ranges of samples.

9. An echo canceller comprising in combination:
    means for storing an impulse response in a memory, said impulse response being indicative of the characteristics of a transmission line;
    means for detecting variable sized ranges of samples within said impulse response having echo energy, by locating a central sample of an echo and computing a radius of echo about said central sample in order to define said variable sized ranges;
    an echo canceller means including a digital filter having a plurality of weighted taps, each of said weighted taps having an associated tap weight value; and
    tap allocation means for activating and deactivating variable numbers of said taps in response to said detecting means so that only taps within said ranges of samples are turned on within said echo canceller and taps outside said ranges of samples are turned off.

10. The echo canceller of claim 9, further including windowing means for adjusting said tap weight values with a windowing function.

11. The echo canceller of claim 9, wherein said detecting means includes means for computing a center of echo of each of said ranges of samples within said impulse response having echo energy.

12. The echo canceller of claim 11, wherein said tap allocation means includes means for activating a plurality of taps within a predetermined multiple of radii of echo about each of said centers of echo of said ranges of samples.

13. The echo canceller of claim 9, wherein said digital filter includes a transversal digital filter.

14. The echo canceller of claim 12, wherein said tap allocation means includes means for activating taps within 2.5 to 3.5 times the radius of echo about each of said centers of echo of each of said ranges of samples.

15. The echo canceller of claim 12, wherein said tap allocation means includes means for activating taps within approximately 3.0 times the radius of echo about each of said centers of echo of said ranges of samples.

16. The echo canceller of claim 9, wherein said echo canceller means includes a plurality of multipliers and wherein said tap allocation means includes means for bypassing multiplication by said multipliers in order to turn off said taps.

17. The echo canceller of claim 9, wherein said tap allocation means includes:
    means for estimating average power of ranges of samples;
    means for comparing said estimated average power with a predetermined threshold to coarsely locate said ranges of samples containing echo energy;
    means for computing a center of echo of each of said coarsely located ranges of samples; and means for turning on echo canceller taps within a predetermined number times the radius of echo about each of said centers of echo.

18. A method of locating taps for allocation to an echo canceller, comprising the steps of:
   storing a plurality of samples representative of a transmission line's impulse response;
   estimating the average power in said stored samples;
   comparing said estimated average power to a predetermined threshold in order to coarsely locate samples containing echo energy;
   computing the center of echo of said coarsely located samples in order to estimate the center of the echo energy; and
   computing a radius of echo about said center of echo in order to estimate the spread of the echo energy.

19. An echo canceller comprising in combination:
   means for storing an impulse response in a memory, said impulse response being indicative of the characteristics of a transmission line;
   an echo canceller means including a digital filter having a plurality of weighted taps, each of said weighted taps having an associated tap weight value;
   means for estimating the average power of ranges of samples of said impulse response;
   means for comparing said estimated average power with a predetermined threshold to coarsely locate ranges of samples containing echo energy;
   means for computing a center of echo of each of said ranges of samples of said impulse response;
   means for computing a radius of echo about each said center of echo;
   tap allocation means for activating a variable number of echo canceller taps within a range of 2.5 to 3.5 times the radius of echo about each said center of echo.

* * * * *